(12) United States Patent
Nishino et al.

(10) Patent No.: US 10,293,570 B2
(45) Date of Patent: May 21, 2019

(54) RESIN TUBE, AND METHOD OF MANUFACTURE THEREOF

(71) Applicant: Panasonic Intellectual Property Management Co., Ltd., Osaka (JP)

(72) Inventors: Shouma Nishino, Osaka (JP); Takashi Morimoto, Osaka (JP); Hideo Mine, Nara (JP); Kazuyuki Harada, Osaka (JP); Masashi Tanaka, Hyogo (JP); Takeshi Kiritoshi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 38 days.

(21) Appl. No.: 15/375,899

(22) Filed: Dec. 12, 2016

(65) Prior Publication Data
US 2017/0217118 A1   Aug. 3, 2017

(30) Foreign Application Priority Data

Feb. 1, 2016  (JP) .................. 2016-016808

(51) Int. Cl.
| | |
|---|---|
| *B32B 1/08* | (2006.01) |
| *B29C 57/10* | (2006.01) |
| *B32B 27/20* | (2006.01) |
| *B29C 53/56* | (2006.01) |
| *B29C 53/84* | (2006.01) |

(Continued)

(52) U.S. Cl.
CPC .............. *B32B 1/08* (2013.01); *B29C 53/84* (2013.01); *B29D 23/001* (2013.01); *B32B 3/02* (2013.01); *B32B 3/08* (2013.01); *B32B 5/02* (2013.01); *B32B 7/12* (2013.01); *B32B 27/12* (2013.01); *B32B 27/20* (2013.01); *B32B 27/32* (2013.01); *B29C 45/14475* (2013.01); *B29C 53/04* (2013.01); *B29C 2793/0027* (2013.01); *B29C 2793/0081* (2013.01); *B29K 2101/12* (2013.01); *B29K 2105/0809* (2013.01); *B29L 2023/22* (2013.01); *B32B 2250/05* (2013.01);
(Continued)

(58) Field of Classification Search
CPC .............. B29D 23/001; B29K 2101/12; B29K 2105/06; B29K 2023/065; B29K 2105/0872; B29L 2023/22; B32B 1/08; B32B 2587/00; B32B 3/02; B32B 7/12; B32B 27/30; B32B 27/20; B32B 27/12; B32B 27/32; B32B 2597/00; F16L 11/081; B29C 7/10; B29C 53/56; B29C 53/84
USPC ...................... 428/34.1, 36.1, 34.7
See application file for complete search history.

(56) References Cited

U.S. PATENT DOCUMENTS

| | | | |
|---|---|---|---|
| 5,178,706 A * | 1/1993 | Nishibara | ............. B29C 55/023 156/163 |
| 5,585,062 A | 12/1996 | Muramatsu et al. | |

(Continued)

FOREIGN PATENT DOCUMENTS

| | | |
|---|---|---|
| JP | 60-036217 U | 3/1985 |
| JP | 3-150135 | 6/1991 |

(Continued)

*Primary Examiner* — Camie S Thompson
(74) *Attorney, Agent, or Firm* — Panasonic IP Management; Kerry S. Culpepper

(57) ABSTRACT

Disclosed herein is easy and efficient production of a light and strong resin tube. A resin sheet is molded into a tubular form having a gap, and at least the gap portion is sealed with resin to produce a resin tube. This enables easy and efficient production of a light and strong resin tube.

6 Claims, 15 Drawing Sheets

(51) Int. Cl.
  *B29D 23/00* (2006.01)
  *B32B 5/02* (2006.01)
  *B32B 7/12* (2006.01)
  *B32B 27/12* (2006.01)
  *B32B 27/32* (2006.01)
  *B32B 3/02* (2006.01)
  *B32B 3/08* (2006.01)
  *B29K 101/12* (2006.01)
  *B29L 23/00* (2006.01)
  *B29K 105/08* (2006.01)
  *B29C 45/14* (2006.01)
  *B29C 53/04* (2006.01)

(52) U.S. Cl.
  CPC ... *B32B 2250/40* (2013.01); *B32B 2262/0253* (2013.01); *B32B 2597/00* (2013.01)

(56) References Cited

U.S. PATENT DOCUMENTS

| | | |
|---|---|---|
| 5,840,347 A | 11/1998 | Muramatsu et al. |
| 2003/0178082 A1 | 9/2003 | Yamaguchi et al. |
| 2010/0196637 A1 | 8/2010 | Lippert et al. |

FOREIGN PATENT DOCUMENTS

| | | |
|---|---|---|
| JP | 8-072157 | 3/1996 |
| JP | 2002-013675 | 1/2002 |

\* cited by examiner (STEP d)

FIG. 10
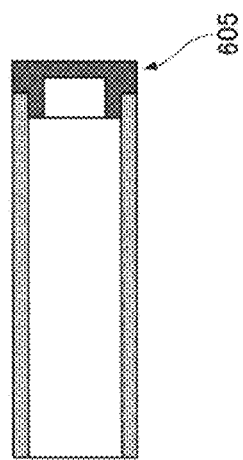
(EXAMPLE 1)
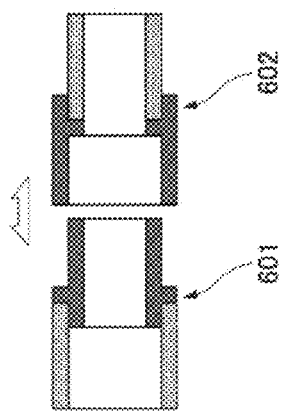
(EXAMPLE 2)
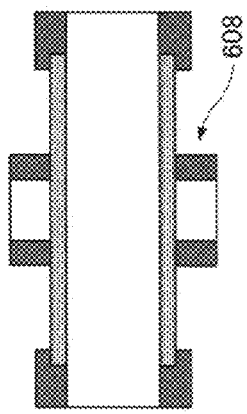
(EXAMPLE 3)
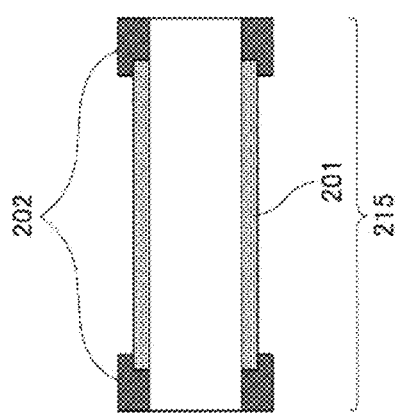
(EXAMPLE 4) (EXAMPLE 5)
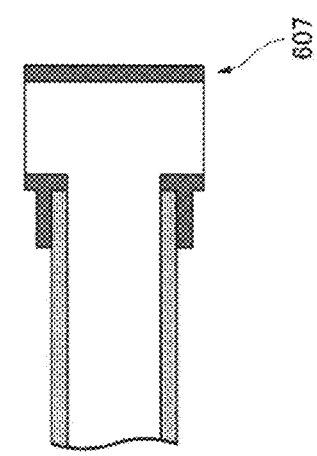
(EXAMPLE 6)

(HEAT FUSION)  (INJECTON JOINING)  (PRESENT DISCLOSURE)

US 10,293,570 B2

RESIN TUBE, AND METHOD OF MANUFACTURE THEREOF

TECHNICAL FIELD

The technical field relates to a resin tube made of resins such as fiber-reinforced multilayer thermoplastics, and to a method of manufacture of such resin tubes.

BACKGROUND

Traditionally, a typical method of manufacture of plastic tubes uses, for example, injection molding or extrusion molding to mold a tube of the desired diameter and length. However, fiber-reinforced resins that are moldable by these methods can have discontinuous fibers (short fiber lengths), and the product plastic tube suffers from poor strength.

More recent methods of manufacture of plastic tubes use continuous fibers to obtain lighter and stronger plastic tubes. A known typical example of such methods is a method that uses filament winding. FIG. 16 is a diagram representing a manufacturing method based on filament winding.

Referring to FIG. 16, a resin-impregnated fiber base material 51 in a resin tank 50 is wound around a rotating mandrel 53 multiple times through a delivery eye 52, and is cured after a predetermined number of rotations to achieve a tube shape of the desired thickness. A problem, however, is the low productivity and the high cost due to the high investments needed for the equipment, and the need for multiple winding to achieve the desired thickness.

There are methods that address this problem, as in, for example, JP-A-8-72157. FIG. 17 is a diagram representing the sheet winding method described in this publication.

Referring to FIG. 17, a thermoplastic prepreg 41 is shaped into a tube by being wound around a mandrel 31 with a guide 32 disposed between an upper plate 11 and a lower plate 12 constituting rolling plates. In this method, the prepreg 41 disposed on the guide 32 is heated and softened on the side of the lower plate 12 provided with a heating means 23, and wound around the mandrel 31 as the lower plate 12 moves. About halfway through the winding, the prepreg 41 is forcibly cooled with, a cooling means 19 provided on the upper plate 11. After a full rotation, the prepreg 41 is reheated and fused under the heat of the heating means 23 of the lower plate 12. After being wound a predetermined number of times, the prepreg 41 is finally cooled with a second cooling means provided on the lower plate 12.

However, the configuration of the related art requires winding the prepreg 41 a predetermined number of times until the final shape (thickness) is achieved, and repeating the heating and cooling procedures for fusing and solidification. The heating and melting temperature of molding also needs to be set in a temperature range high enough to melt the matrix resin but low enough not to melt the reinforcement fibers. Further, the winding process involves repeated heating and cooling performed roughly for the same duration in the first and the second half of each rotation. It is accordingly difficult to set temperature conditions, and the process involves low productivity and high cost. Another drawback is that a tubular structure produced by the process is often incomplete as a product, and requires a post-process for imparting a functional shape (e.g., a part to toe joined to other tubes), for example, at the ends or the middle of the tube. A problem, however, is that such a functional shape cannot be easily imparted to the plastic tube.

SUMMARY

The present disclosure is intended to provide a solution to the foregoing problems, and it is an object of the present disclosure to provide a way to easily produce a light and strong resin tube with high productivity.

In an aspect of the disclosure, a method for manufacturing a resin tube is provided that includes:

forming a tubular structure by molding a resin sheet in a tubular form with a gap formed between end portions of the resin sheet; and sealing at least the gap with resin to seal the tubular structure.

In another aspect of the disclosure, a resin tube is provided that includes:

a tubular structure of one or more resin sheets each of which is disposed by being separated by a gap; and a joint resin sealing at least the gap to seal the tubular structure.

In this manner, a resin sheet is molded into a tubular form having a gap, and at least the gap portion is sealed with resin to produce a resin tube. This enables easy and efficient production of a light and strong resin tube.

BRIEF DESCRIPTION OF THE DRAWINGS

FIG. 10 shows diagrams representing examples of a longitudinal section of a functional shape at the both axial ends of a fiber-reinforced multilayer thermoplastic tube of Sixth Embodiment.

DESCRIPTION OF EMBODIMENTS

In a method for manufacturing a resin tube of, for example a fiber-reinforced multilayer thermoplastic according to the present disclosure, a material resin sheet, such as a resin blank, is first molded into a tubular shape. Here, the resin sheet is molded with the both end portions facing each other with a gap in between. A joint resin is then supplied to the gap, and, if necessary, to the tube region surrounding the gap, and the resin is cured to fix the resin tube.

Embodiments of the present disclosure are described below through the case where the resin sheet is a fiber-reinforced multilayer thermoplastic sheet, with reference to the accompanying drawings.

First Embodiment

Figure 14:
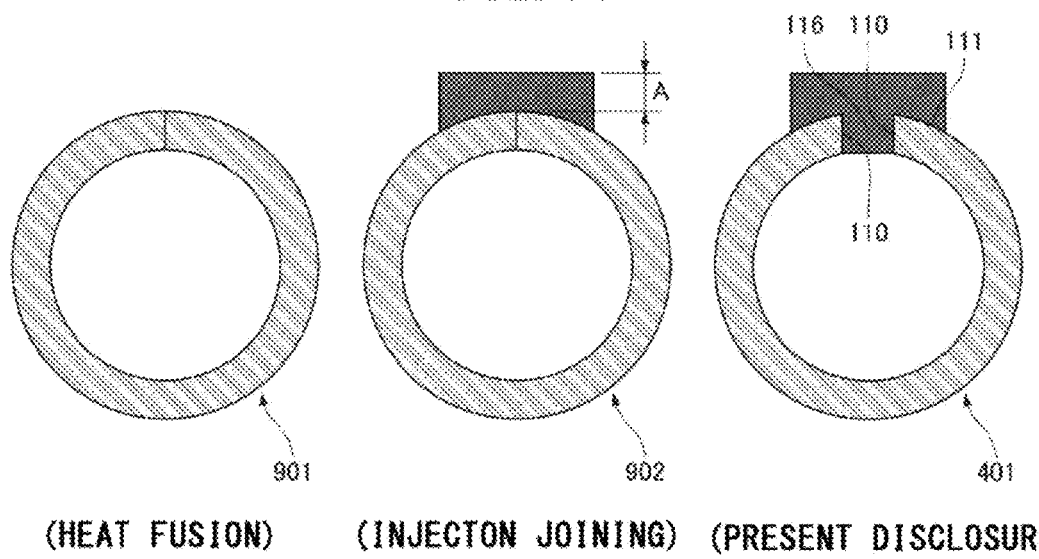
FIG. 14 shows diagrams explaining different joint states of resin sheets with and without a gap.

The reason for providing a gap in a molded tubular resin sheet of the present disclosure is described first. FIG. 14 compares the resin sheet configuration between a tubular resin sheet formed without a gap, and a tubular resin sheet formed with a gap, explaining the different joint states of the resin sheets with and without a gap. The configuration 901 ("heat fusion" in FIG. 14) and the configuration 902 ("injection joining" in FIG. 14) are fiber-reinforced multilayer thermoplastic sheets (hereinafter, also referred to simply as "sheets") joined in a 0-mm gap setting (the end surfaces are in contact with each other). The configuration 901 was joined by heating and fusing the butted sheet end portions, whereas the butted sheet end portions were joined by injection joining in the configuration 902. A gap is absent at the sheet end portions in these configurations. With a 0-mm gap, it was difficult to join the sheet end portions in the both configurations 901 and 902, because of the sheet cut accuracy, and the thermal expansion of the sheet. The configuration 901 by heat fusion needs to be joined under no applied pressure to reduce melting and crumbling of the fibers in the sheet, and the joint strength is insufficient. In the configuration 902, the joint strength is secured by thickness A of a joint cross section, and the strength becomes insufficient when the thickness A is 5 mm or less. With these findings, the present disclosure concerns a configuration 401 ("present disclosure" in FIG. 14) having a gap 116 between sheet mating surfaces 110, and that is joined at two surfaces, one at the sheet sating surfaces 110, and one at the radial outer circumferential surface 111 of the tube. In a cross section of the configuration 401, a joint resin is injected into a radial joint space (joint space 109, described later) provided inside a mold, including the gap 116 between the sheet mating surfaces 110, and joins the sheet at the sheet mating surfaces 110, and at the radial outer circumferential surface 111 of the sheet.

The tube that had the gap 116 at the stating surfaces 110, and that was joined with a resin at the gap 116 and at the circumferential surface of the tube received much less heat at the bonding faces of the sheet than a tube of the configuration 901 joined by heat fusion. The tube thus had reduced thermal, shrinkage at the mating surfaces 110, and the sheet had less warpage, making the tube highly round.

Figure 15:
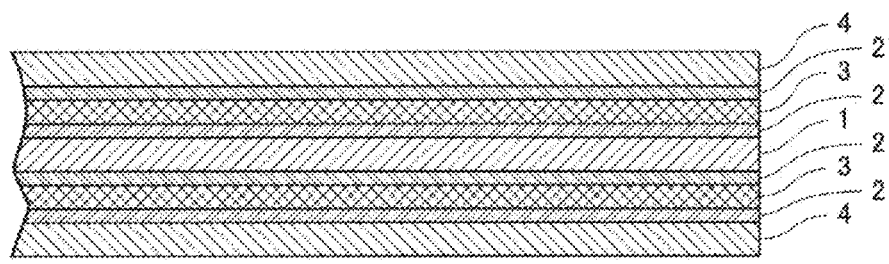
FIG. 15 is a diagram representing an exemplary configuration of a fiber-reinforced polyolefinic multilayer thermoplastic sheet.
Figure 16:
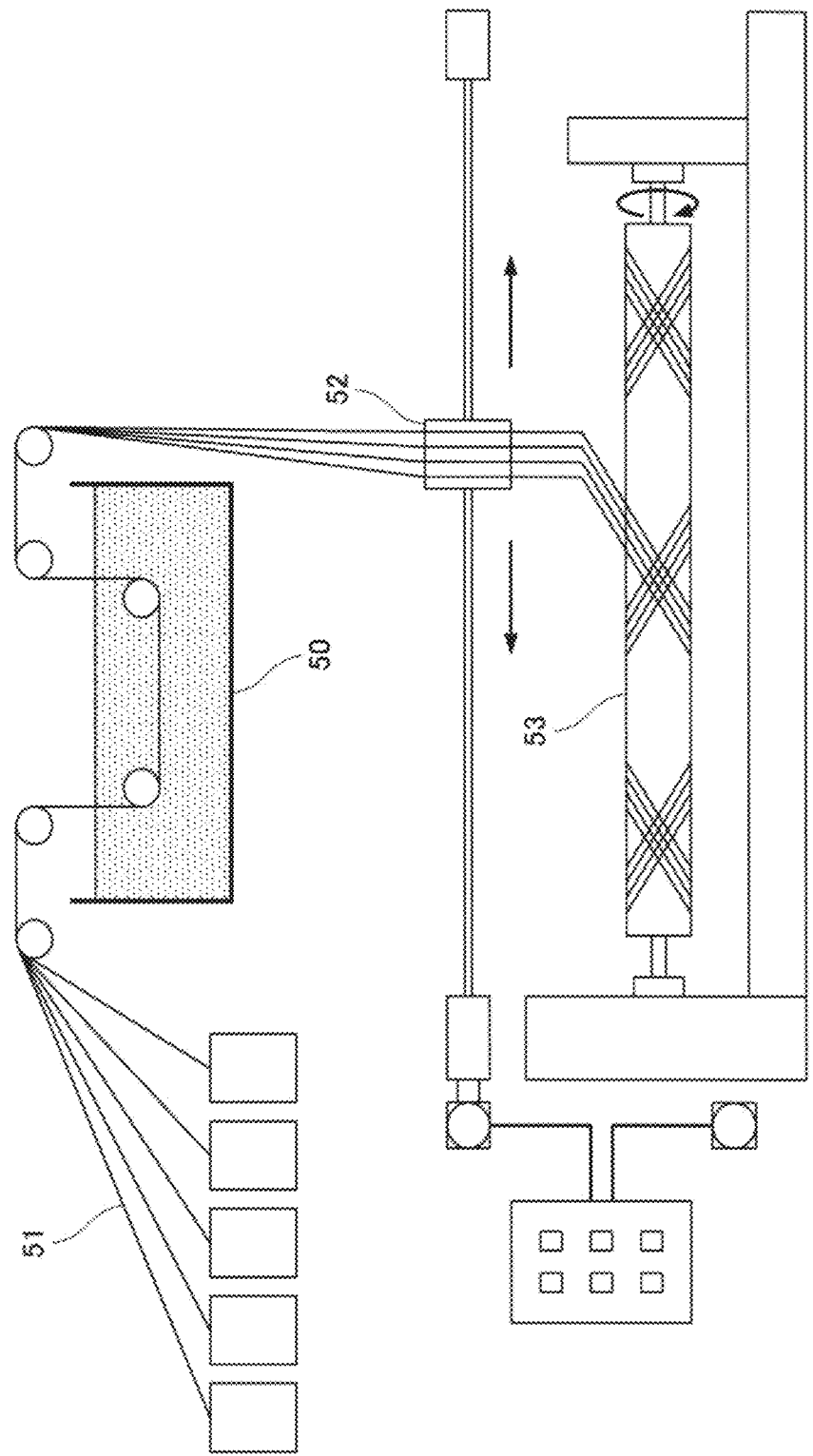
FIG. 16 is a diagram representing a common filament winding method.
Figure 17:
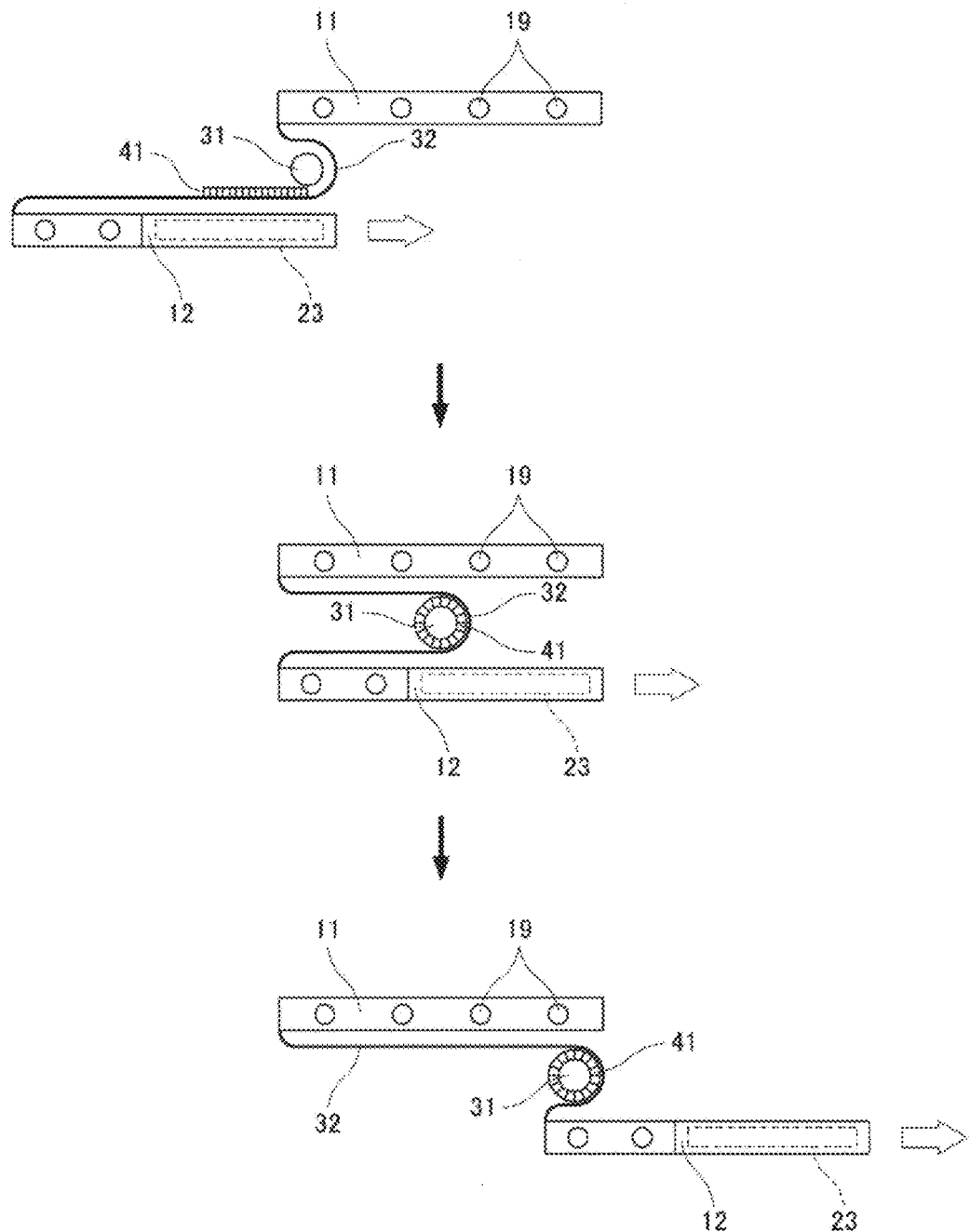
FIG. 17 is a diagram representing the sheet winding method described in JP-A-8-72157.

A polyolefinic sheet was used as the fiber-reinforced multilayer thermoplastic sheet. FIG. 15 is a diagram illustrating the fiber-reinforced, multilayer thermoplastic sheet. The sheet has a laminated structure formed by laminating a core layer 1 at the center, and on the both sides of the core layer 1, adhesive layers 2, textile layers 3 as fabric layers containing reinforcement fibers, and surface layers 4 as matrix resin sheets to a predetermined thickness. The sheet, with a total thickness of 1.2 mm, was cut into a 79 mm×306 mm size, and used, as a blank (blank 102, described later). Winding a blank of this size around a cylindrical core rod having an outer diameter ϕ of 27 mm creates a gap of about 5.8 mm at the sheet mating surfaces. For example, a 2.0 mm joint space may be provided in a mold on the outer circumference side.

A plastic tube with high joint strength can be obtained by setting the gap and the joint space in a manner described below. The gap that has a length of at least 0.3 mm and at most 30% of the circumferential length is provided at the mating surfaces of the sheet, and a space measuring 0.3 mm or more and 5 mm or less from, the inner or outer edge of the sheet along the radial direction, and measuring 1.5 mm or sore and 20 mm or less from each end surface of the sheet along the circumferential direction is provided in a mold relative to the gap center. A space measuring at least 2 mm from the end surface of the sheet along the axial direction also may foe provided at the both axial ends of the tube.

The same polyolefinic resin used for the polyolefinic sheet shown in FIG. 15 may be used for the joint resin. By using the same resin for the sheet and the joint resin, joining by an anchoring effect and joining by melting in portions occur on the sheet surface, the joint strength can further improve.

Figure 1:
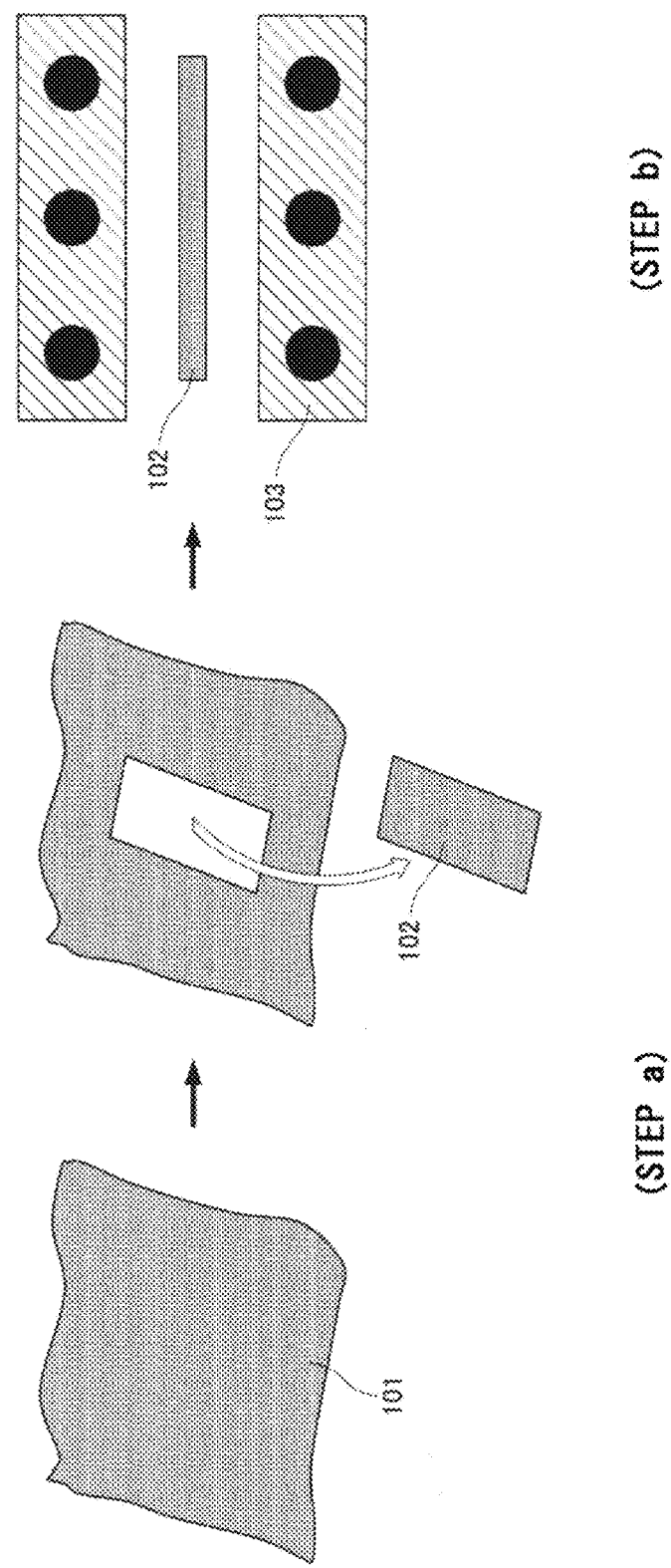
FIG. 1 represents the steps of an exemplary method for manufacturing a plastic tube of First Embodiment, schematically illustrating a relevant portion of an exemplary configuration of a manufacturing apparatus.
Figure 2:
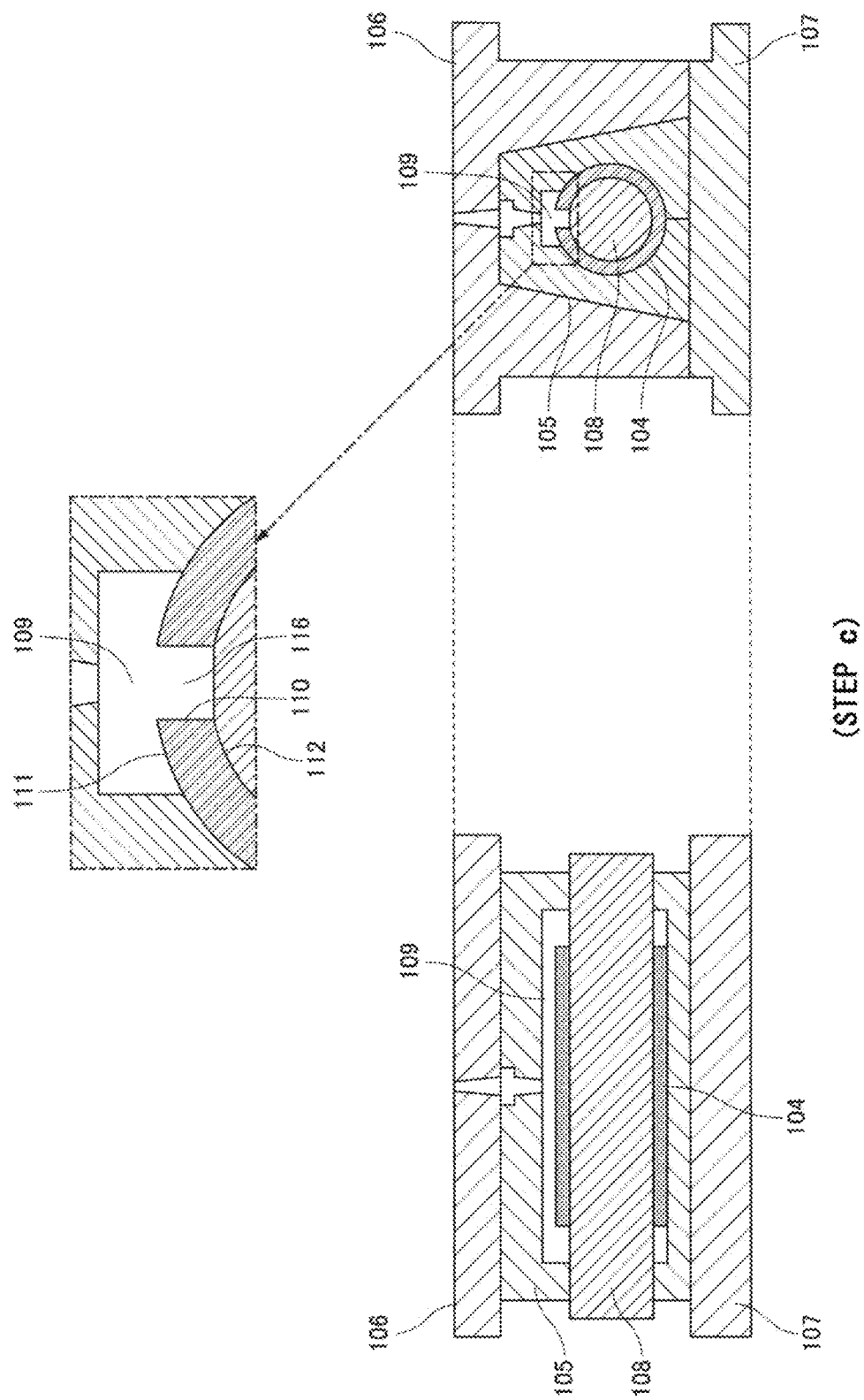
FIG. 2 represents the steps of an exemplary method for manufacturing the plastic tube of First Embodiment, schematically illustrating a relevant portion of an exemplary configuration of a manufacturing apparatus.
Figure 3:
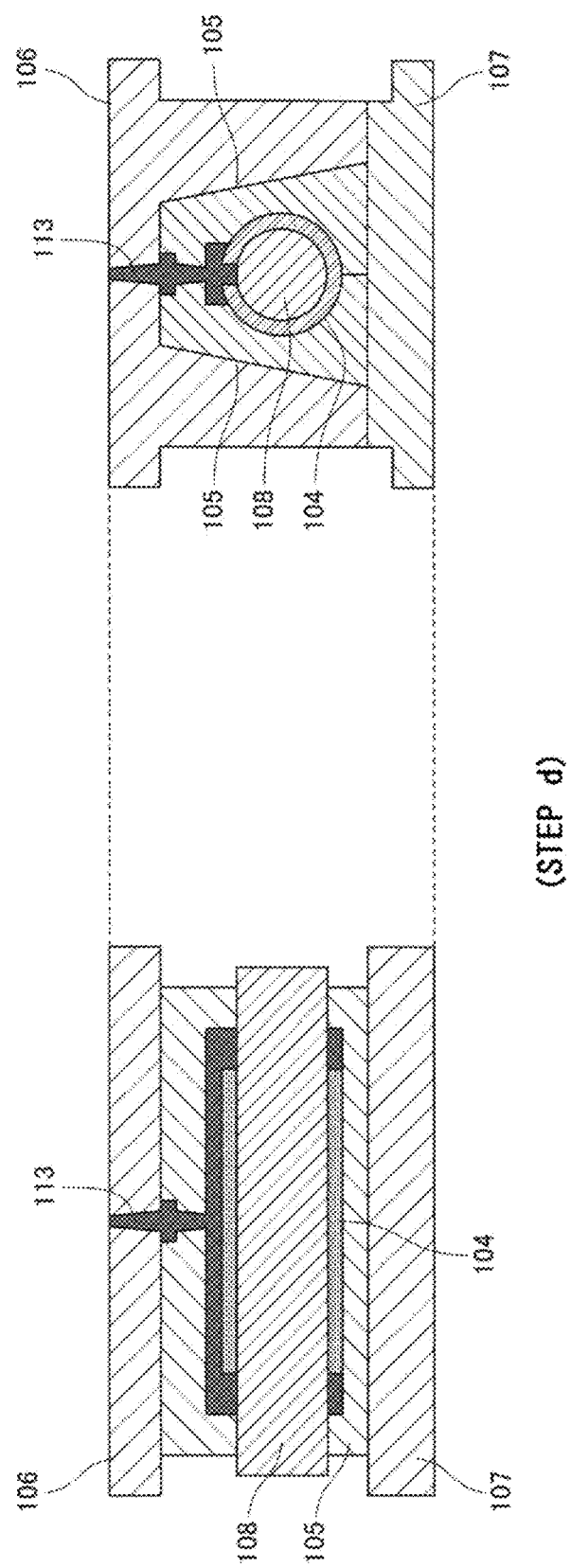
FIG. 3 represents the steps of an exemplary method for manufacturing the plastic tube of First Embodiment, schematically illustrating a relevant portion of an exemplary configuration of a manufacturing apparatus.
Figure 4:
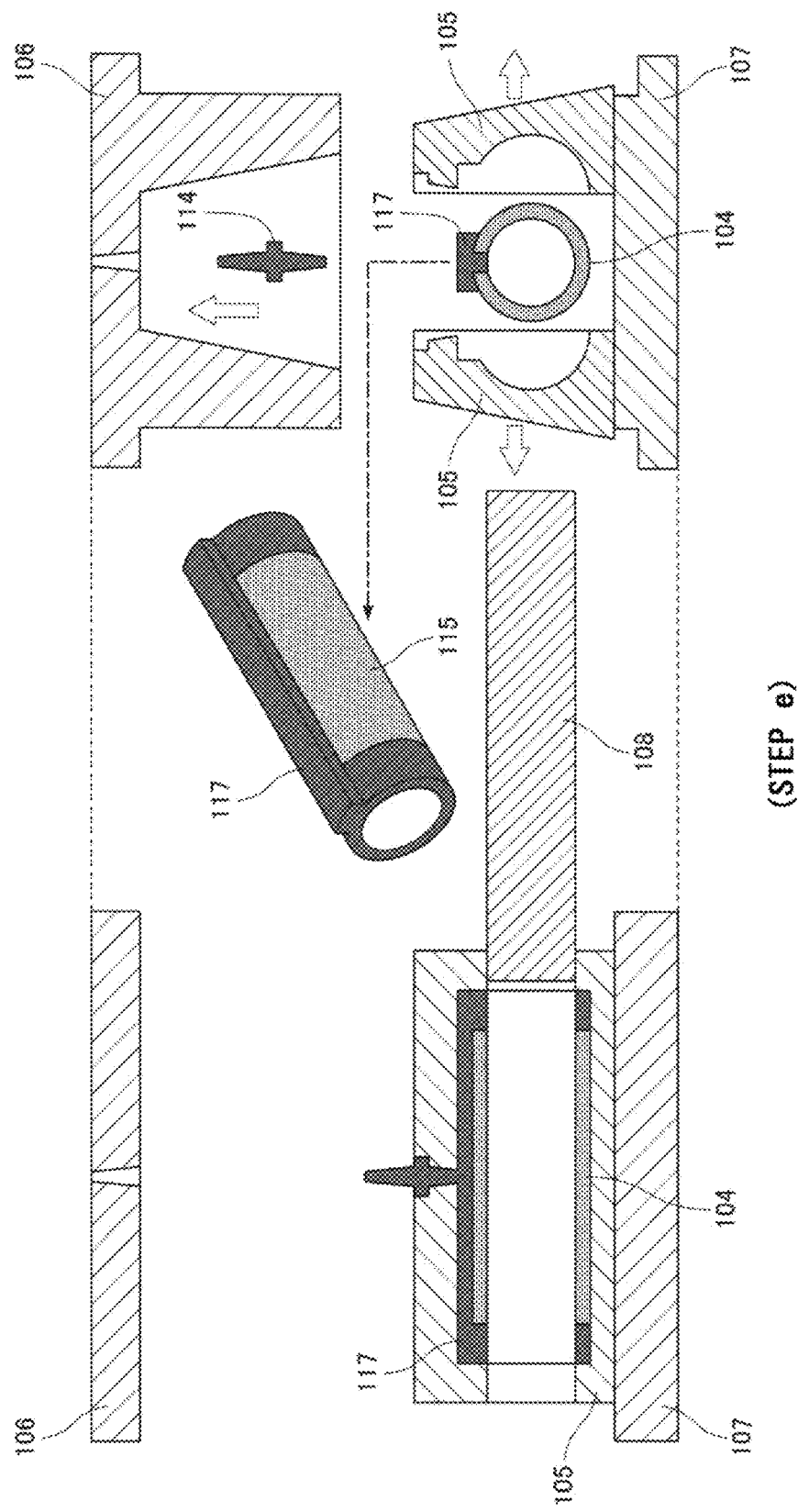
FIG. 4 represents the steps of an exemplary method for manufacturing the plastic tube of First Embodiment, schematically illustrating a relevant portion of an exemplary configuration of a manufacturing apparatus.

FIGS. 1 to 4 are diagrams representing the steps of manufacturing the fiber-reinforced multilayer thermoplastic tube of First Embodiment of the present disclosure. Referring to FIG. 1, the thermoplastic multilayer fiber plastic sheet 101 is cut into a predetermined size to provide a blank 102 (step a in FIG. 1). The blank 102 is then placed and held between the upper and lower plates of a pre-heating jig 103, and pre-heated at 60° C. for 30 seconds with heaters provided in the upper and lower plates (step b in FIG. 1). After being pre-heated, the blank 102 is disposed inside a mold configured from a cavity 106, a slidable core 105, a cylindrical core rod 108, and a core 107. Upon closing the mold in the injection molding machine, the slidable core 105 attached to the core 107 moves toward the cavity 106, and the blank 102 is formed info a tubular blank 104. The blank 102 is wound around the core rod 108 and has the radial joint space 109 and a gap created between the sheet mating surfaces 110. This completes the closure step (step c in FIG. 2). A molten joint resin is then injected into the radial joint space 109 through a sprue 113 provided in the cavity 106 and the slidable core 105, and joins the tubular blank 104 as a single molded unit, (step d in FIG. 3). After cooling, the core 107 is opened to release the slidable core 105, a runner 114 is removed, and the cylindrical core rod 108 is pulled out to thereby extract a fiber-reinforced, multilayer thermoplastic tube 115 that has been formed as a single molded tubular unit configured by the plastic sheet formed into a tubular structure having the joint space between the mating surfaces 110 and the joint resin 117 injected in the joint space (step e in FIG. 4).

The tube of the foregoing configuration from a fiber-reinforced multilayer thermoplastic sheet had a flexural strength (JIS K6911-1979) that was 1.2 times higher than that of a tube of the same thickness produced by injection molding of a polypropylene (BC03B) available from Japan Polypropylene Corporation. By the provision of the gap 116 between the sheet mating surfaces 110, the thermal expansion that occurs upon injecting the joint resin into the joint space can be ignored. This eliminates the need for accurate alignment, and easily allows for more flexibility in the position accuracy and the molding conditions of the tubular blank 104, making it possible to produce a precision, light and strong resin tube with high productivity and yield.

It is to be noted that the pre-heating jig 103 provided for preliminary heating in the present embodiment may be omitted when the tubular blank 104 is easily deformable. In the present embodiment, the joint resin, joins the blank 102 after the blank 102 had a tubular shape by being wound around the cylindrical core rod 108 by the movement of the slidable core 105 upon closing the mold in the molding machine. However, the joint resin, may join the blank 102 in the mold after the blank 102 is pre-heated with the pre-heating jig 103, and preliminarily bent with, a different jig. The radial joint space 109 may be provided on the inner circumferential surface 112 side of the tubular blank 104. In the present embodiment, a polyolefinic resin is used for the reinforcement fibers and the matrix resin sheet. However, the type of material is not particularly limited, provided that the fibers are continuous reinforcement fibers capable of forming a fabric layer, and that the resin can be laminated in a sheet form. The joint resin used in the present embodiment uses the same polyolefinic material used for the polyolefinic sheet configured from the polyolefinic reinforcement fibers and the matrix resin sheet. However, the combination of materials is not particularly limited, and the tube may be produced by joining reinforcement fibers and sheets of different materials.

Second Embodiment

Figure 5:
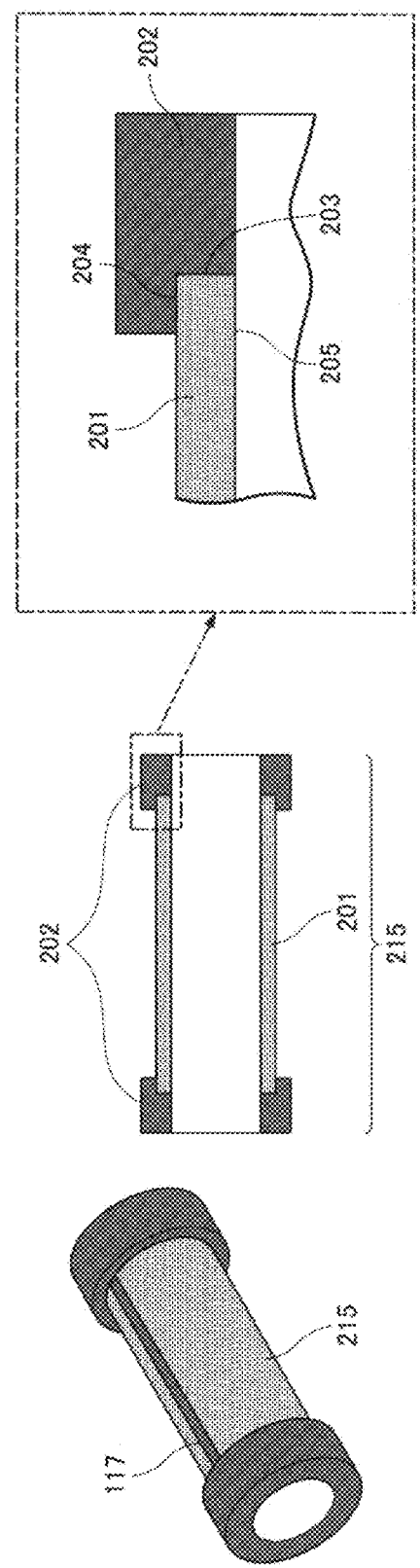
FIG. 5 is a diagram illustrating an axial cross section of a fiber-reinforced multilayer thermoplastic tube of Second Embodiment.
Figure 6:
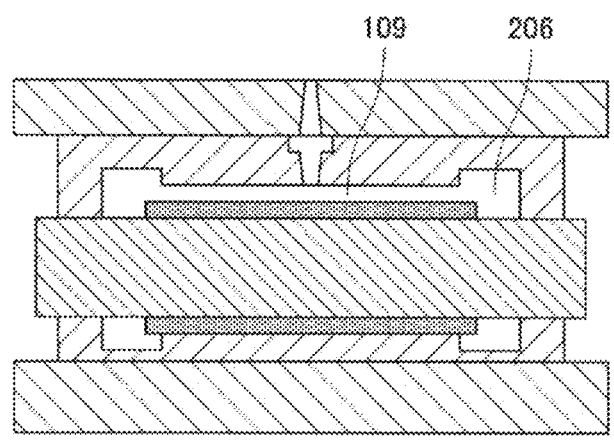
FIG. 6 is a diagram representing an exemplary configuration of a mold in an apparatus used to manufacture the fiber-reinforced multilayer thermoplastic tube of Second Embodiment.

FIG. 5 is a diagram illustrating a longitudinal sectional shape of a fiber-reinforced multilayer thermoplastic tube of Second Embodiment of the present disclosure. FIG. 6 is a diagram representing an exemplary configuration of a mold in a manufacturing apparatus used to produce the fiber-reinforced multilayer thermoplastic tube of Second Embodiment. In FIGS. 5 and 6, the same reference numerals are used for the constituting elements already described in FIGS. 1 to 4, and these will not be described further.

The resin tube produced in Second Embodiment has a configuration in which an additional shape is imparted to the both end portions of the fiber-reinforced multilayer thermoplastic tube described in First Embodiment. The additional shape is, for example, a functional shape with certain functions, and is formed integrally with the joint resin, using a mold having an axial joint space 206 that is continuous to the radial joint space 109, and for molding a resin into a functional shape.

Referring to FIGS. 5 and 6, the longitudinal sectional shape of a fiber-reinforced multilayer thermoplastic tube 215 of an integrally molded tubular shape is configured from a tubular structure 201 constituting the body of the fiber-reinforced multilayer thermoplastic tube 215, and a functional shape 202 imparted to the tubular structure 201. The functional shape 202 imparted to the end portions of the tubular structure 201 is formed on the axial end surfaces 203 and the outer circumferential surface 204 of the tubular structure 201. Here, the axial joint space 206, axially corresponding in position to the functional shape 202 in the mold, has a width of 20.0 mm, and a radial thickness of 2.0 mm, the same thickness set for the radial joint space 109 of First Embodiment.

With this configuration, the tubular blank is joined by a thermoplastic resin on at least two surfaces, one at the end surfaces of the tubular blank, and one at the inner or outer circumferential surface, and the tube can have improved strength, as in First Embodiment. Further, because the functional shape 202 is imparted simultaneously at the time of molding, it is not required to provide an additional post-process to separately impart the functional shape. This improves productivity.

In Second Embodiment, the joint at the axial sheet end surfaces 203 may be made on two surfaces, one at the axial end surfaces 203 of the tubular structure 201, and one at the axial inner circumferential surface 205, or on all three surfaces (at the inner circumferential surface, the outer circumferential surface, and the end surfaces of the tubular blank).

Third Embodiment

Figure 7:
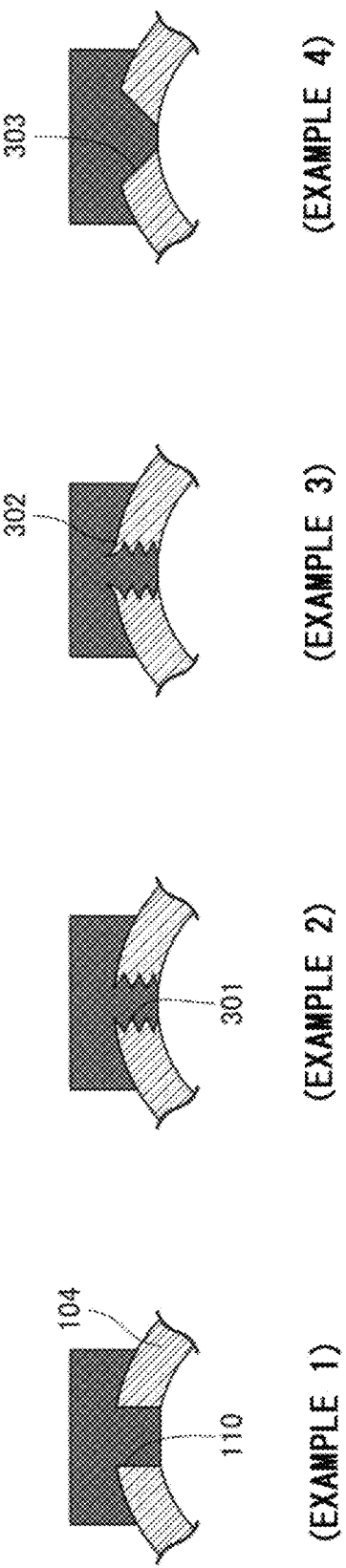
FIG. 7 shows diagrams representing examples of the radial mating surface shape of a fiber-reinforced multilayer thermoplastic sheet of Third Embodiment.

FIG. 7 shows diagrams representing examples of the radial sheet end surface shape of a fiber-reinforced multilayer thermoplastic tube of Third Embodiment of the present disclosure.

Referring to FIG. 7, the end surface shape of the tubular blank 104 is not limited to a smooth shear surface as exemplified by the sheet mating surface 110 (example 1), and may have other shapes, including, for example, a fracture surface 301 (example 2), and a tapered surface 303 (example 4). It is also possible to provide a burr 302 by intentionally providing a large clearance when cutting the blank (example 3).

The rough fracture surface produces an anchoring effect, and the tapered surface and the burr increase the bonding area. These configurations improve the joint strength. Further, because the blank can be cut in any sheet end surface shape, there is no need to cut the blank with precision, and the blank can be produced relatively inexpensively.

The same effects can be obtained when the axial sheet end has a rough surface in Third Embodiment.

Fourth Embodiment

Figure 8:
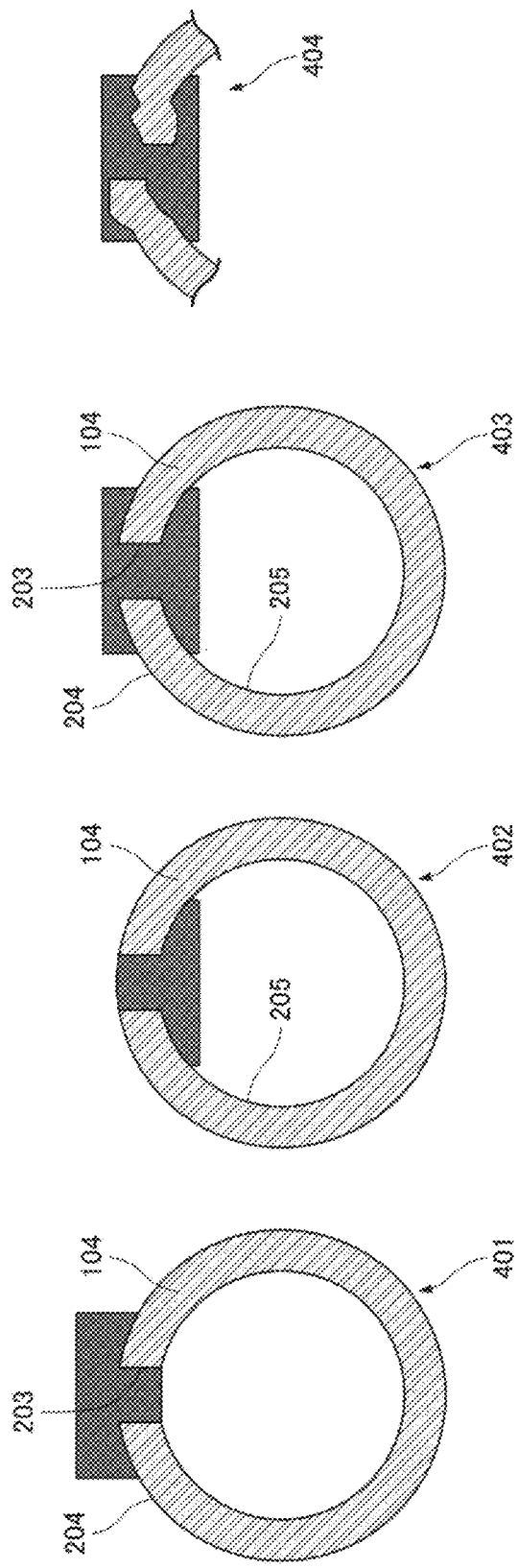
FIG. 8 shows diagrams representing examples of the radial cross sectional shape of a fiber-reinforced multilayer thermoplastic tube of Fourth Embodiment.

FIG. 8 shows diagrams representing examples of the radial sheet joint cross sectional shape of a fiber-reinforced multilayer thermoplastic tube of Fourth Embodiment of the present disclosure.

Referring to FIG. 8, the radial joint cross sectional shape of the fiber-reinforced multilayer thermoplastic tube may have a configuration 401 of a cross sectional shape in which the joint is made at the end surfaces 203 of the tubular blank 104, and the outer circumferential surface 204 of the tubular blank 104 (example 1), a configuration 402 of a cross sectional shape in which the joint is made at the end surfaces 203 of the tubular blank 104, and the inner circumferential surface 205 (example 2), or a configuration 403 of a cross sectional shape in which the joint is made at all three surfaces (at the inner circumferential surface 205, the outer circumferential surface 204, and the end surfaces 203 of the tubular blank 104) (example 3). In the case of the configuration 403 of a cross sectional shape where all three surfaces are joined, the joined mating surfaces are not necessarily required to lie on the circumference, as in a configuration 404 (example 4).

With the foregoing configurations, the required joint strength can be provided by the joint formed at the end surfaces 203 of the tubular blank 104, and the inner circumferential surface and/or the outer circumferential surface of the tubular blank 104, or at all these surfaces. Further, because the heat is applied only in the vicinity of the end surfaces 203 of the tubular blank 104, the product tube does not involve crumpling of fibers, while maintaining strength and quality of appearance.

Fifth Embodiment

Figure 9:
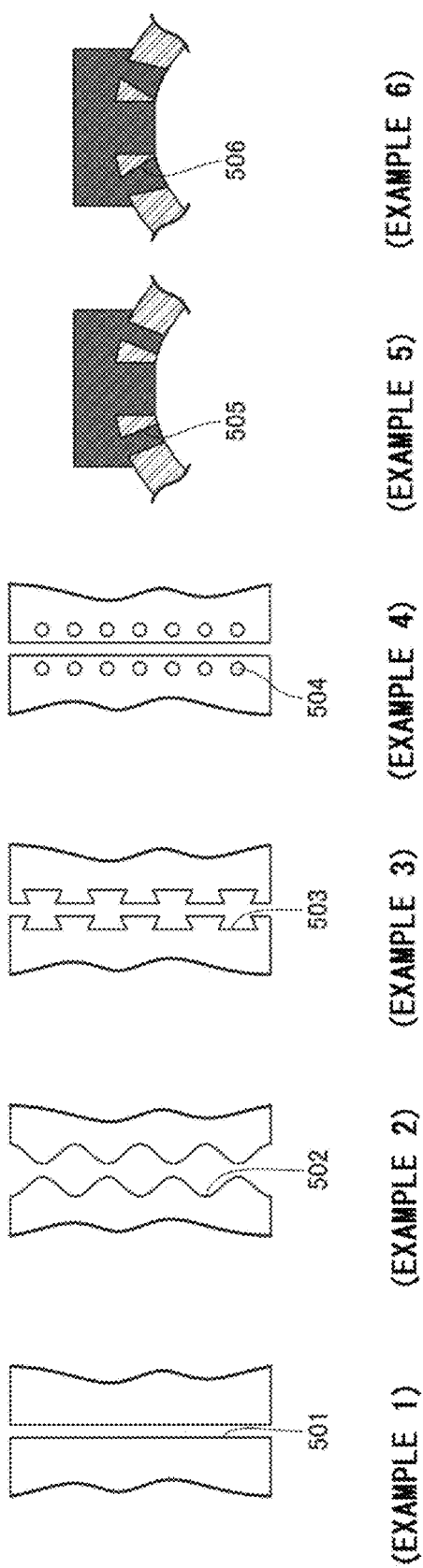
FIG. 9 shows diagrams representing examples of the axial mating surface shape of a fiber-reinforced multilayer thermoplastic sheet of Fifth Embodiment.

FIG. 9 shows diagrams representing examples of the sheet mating surface shape of a fiber-reinforced multilayer thermoplastic tube of Fifth Embodiment of the present disclosure.

Referring to FIG. 9, the sheet mating surface shape of the fiber-reinforced multilayer thermoplastic tube is not limited to a straight line 501 (example 1), and may have a waveform shape 502 (example 2), an undercut-like shape 503 (example 3), or a bored shape 504 with bores formed at a predetermined distance from the end surfaces (example 4). In the bored shape 504, the bores formed at a predetermined distance may be straight bores 505 (example 5) or tapered bores 506 (example 6).

With the foregoing configurations, the mating surfaces of the sheet can have a larger surface area, and the joint strength of the fiber-reinforced multilayer thermoplastic tube becomes stronger when the sheet mating surface has, for example, the waveform shape 502 or the undercut-like shape 503 than when the sheet mating surface shape is the straight line 501. The joint strength can further improve with the undercut-like shape 503.

In Fifth Embodiment, the sheet mating surface of shapes such as above may be provided only at one axial end of the sheet. However, the joint strength can further improve when the foregoing configurations are formed at the both axial ends of the sheet.

Sixth Embodiment

FIG. 10 shows diagrams representing examples of a functional shape at the both axial ends of a fiber-reinforced multilayer thermoplastic tube of Sixth Embodiment of the present disclosure.

Referring to FIG. 10, the functional shape 202 formed at one end or both ends in the axial direction of a fiber-reinforced multilayer thermoplastic tube 215 may have any shape, including, for example, the shape of the fiber-reinforced multilayer thermoplastic tube 215 shown in FIG. 5 (example 1), a male or female joint shape 601 or 602 (example 2), a shape 605 closing one end of the tube (example 3), an L-shape 606 (example 4), and a T-shape 607 (example 5). The location of the functional shape 608 is not limited to the tube ends, and may be imparted in the middle of the tube, or at any other location of the tube (example 6).

With the foregoing configurations, a functional shape of any shape as may be suited for the use of the product tube can be imparted at the time of integral molding, without the need for post-processes, and can flexibly accommodate a range of product uses.

The male and female joint shapes 601 and 602 are not limited to a linear slider joint, and say be, for example, a screw pair.

Seventh Embodiment

Figure 11:
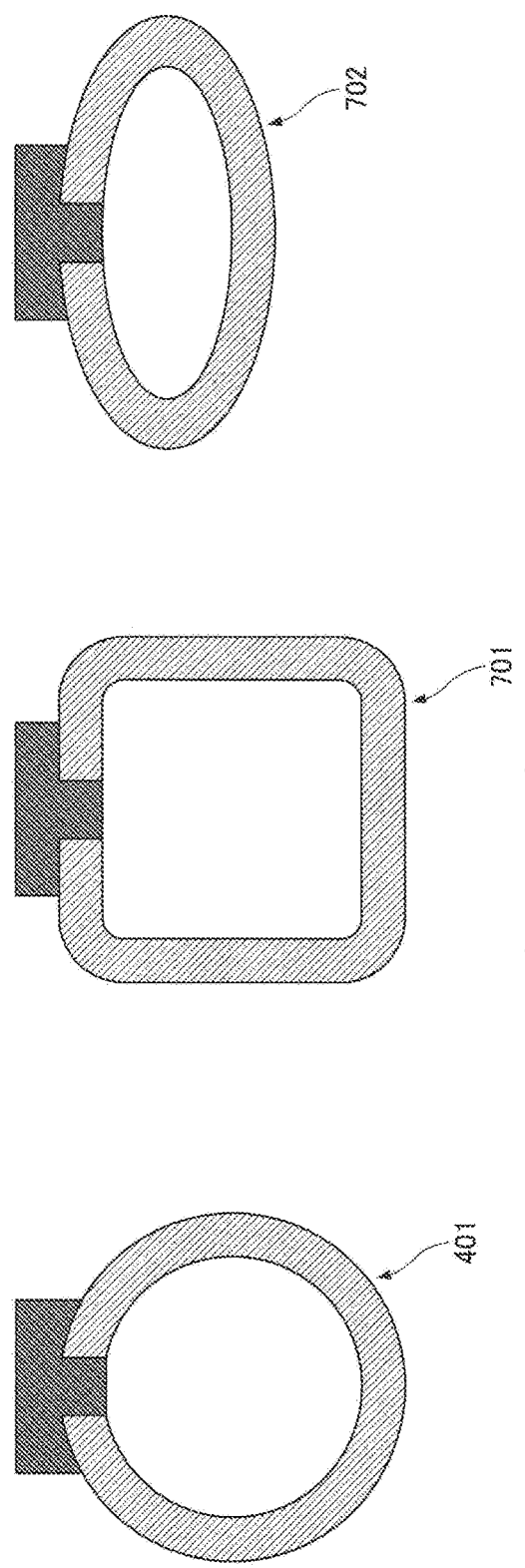
FIG. 11 shows diagrams representing examples of the radial cross sectional shape of a fiber-reinforced multilayer thermoplastic tube of Seventh Embodiment.
Figure 12:
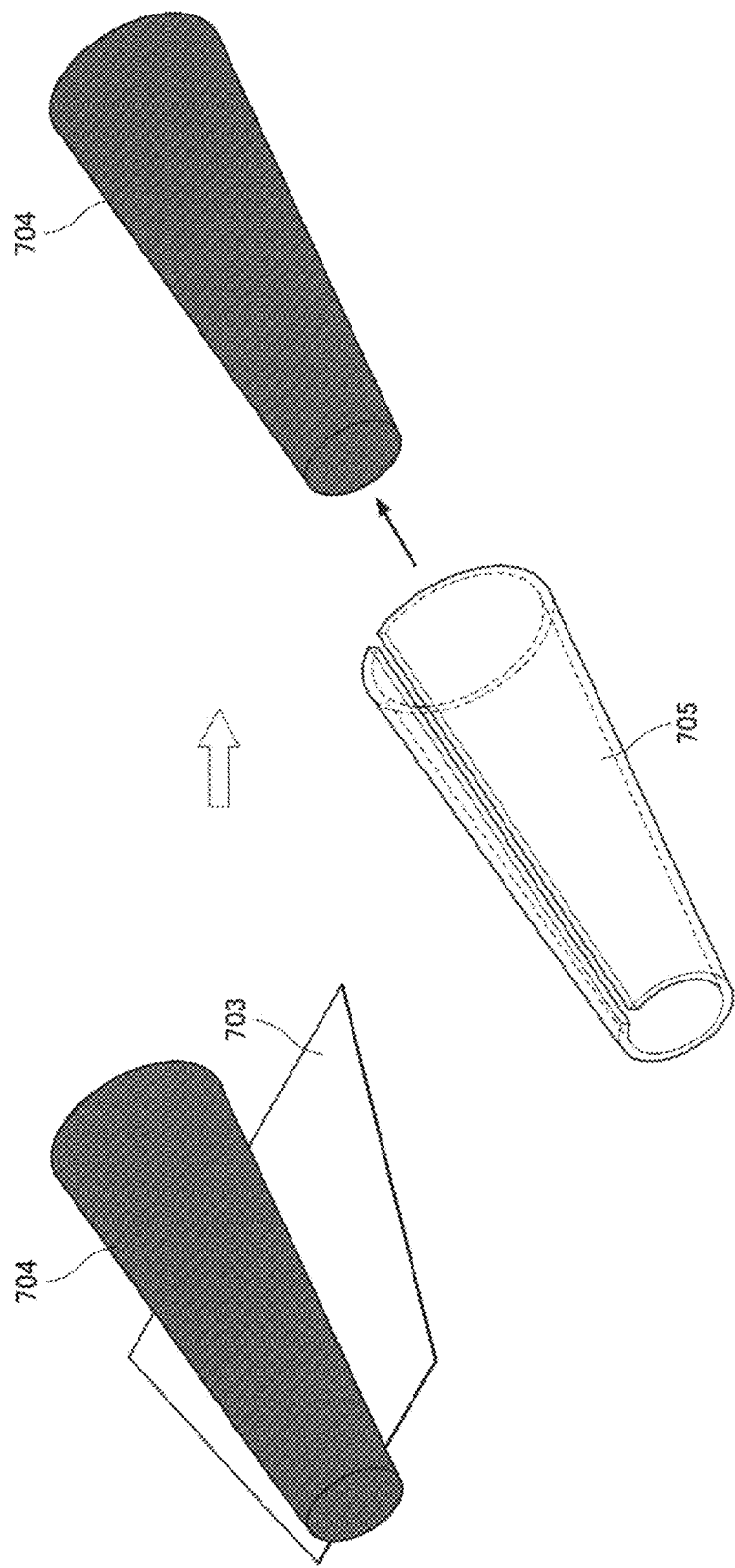
FIG. 12 shows diagrams representing the steps of an exemplary method for producing an axially tapered tube according to Seventh Embodiment.

FIG. 11 shows diagrams representing examples of the cross sectional shape of a fiber-reinforced multilayer thermoplastic tube of Seventh Embodiment of the present disclosure. FIG. 12 shows diagrams representing the steps of an exemplary method for producing an axially tapered tube according to Seventh Embodiment.

Referring to FIG. 11, the cross sectional shape of the tube is not particularly limited, as long as it is a shape resulting from winding. Aside from the circular configuration 401 (example 1), the cross sectional shape may be a rectangular shape 701 (example 2) or an elliptic shape 702 (example 3). As illustrated in FIG. 12, the blank may be cut as a trapezoidal blank 703, and wound around a tapered core rod 704, and joined to produce an axially tapered tube 705.

With this configuration, the product tube can have a non-cylindrical shape, and can be flexibly used in a wide range of applications.

Eighth Embodiment

Figure 13:
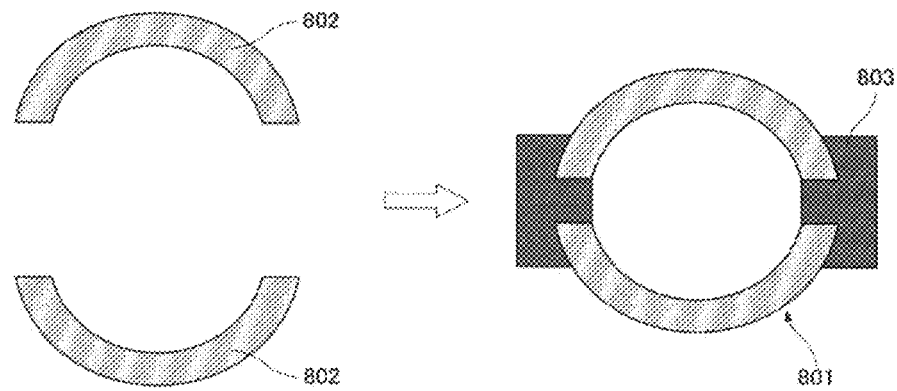
FIG. 13 shows diagrams representing an example of producing a fiber-reinforced multilayer thermoplastic tube of Eighth Embodiment with a plurality of sheets.

FIG. 13 shows diagrams representing the steps of an exemplary method for manufacturing a fiber-reinforced multilayer thermoplastic tube of Eighth Embodiment of the present disclosure.

Referring to FIG. 13, the blank 802 prepared as a fiber-reinforced multilayer thermoplastic sheet is not required to have a single sheet configuration, and two blanks 802 may be joined by a thermoplastic resin 803 to make a tube shape 801. The effects from the configurations of First to Seventh Embodiments also can be obtained by using the configurations even when the fiber-reinforced, multilayer thermoplastic tube is produced from two sheets as in this configuration.

With the foregoing configuration, the roundness further improves when the mating surfaces of the sheets to be joined to each other are at the point of point symmetry or line symmetry in a radial cross section of the tube in a case where joining is performed at multiple mating positions of the sheets. This is also effective at reducing warpage.

The number of sheets may be two or more/and is not particularly limited, as long as the sheets can form a tube shape.

More than one embodiment in First to Eighth Embodiments may be combined in any combination.

INDUSTRIAL APPLICABILITY

The present disclosure enables easy and efficient production of a light and strong resin tube, and is useful in the field of resin tubes made of fiber-reinforced multilayer thermoplastics or similar materials, and manufacturing methods of such resin tubes.

What is claimed is:
1. A resin tube comprising:
a tubular structure of one or more resin sheets each of which is disposed by being separated by a gap; and
a joint resin sealing at least the gap to seal the tubular structure,
wherein the joint resin seals the gap, and at least one of an inner circumferential surface and an outer circumferential surface of the tubular structure in a region adjacent the gap,
wherein the resin sheet is a fiber-reinforced multilayer thermoplastic sheet,
wherein the fiber-reinforced multilayer thermoplastic sheet is a sheet that includes a reinforcement fiber-containing fabric layer, and a matrix resin sheet laminated to a predetermined thickness, wherein the end surfaces of the resin sheet forming end portions of the gap have a fracture surface with a burr, and wherein the gap extends in parallel to an axial direction of the resin tube.

2. The resin tube according to claim 1, wherein the end surfaces of the resin sheet forming end portions of the gap have a waveform shape, an undercut-like shape, or a shape with a bore formed at a distance from the end surfaces.

3. The resin tube according to claim 1, further comprising a functional shape formed on the tubular structure and made of the same resin used for the joint resin, and that has a joint shape, a screw shape, or a shape obtained by closing one end or both ends of the tubular structure.

4. The resin tube according to claim 3, wherein the joint shape is an L-shape, or a T-shape.

5. The resin tube according to claim 4, wherein the tubular structure is columnar, conical, or prismatic in shape.

6. The resin tube according to claim 4, wherein the tubular structure is circular, ellipsoidal, or polygonal in shape in a cross section orthogonal to the axis thereof.

\* \* \* \* \*